April 15, 1924.  
J. J. TROYER  
BALE TIER  
Filed March 14, 1922  
1,490,146  
2 Sheets-Sheet 1
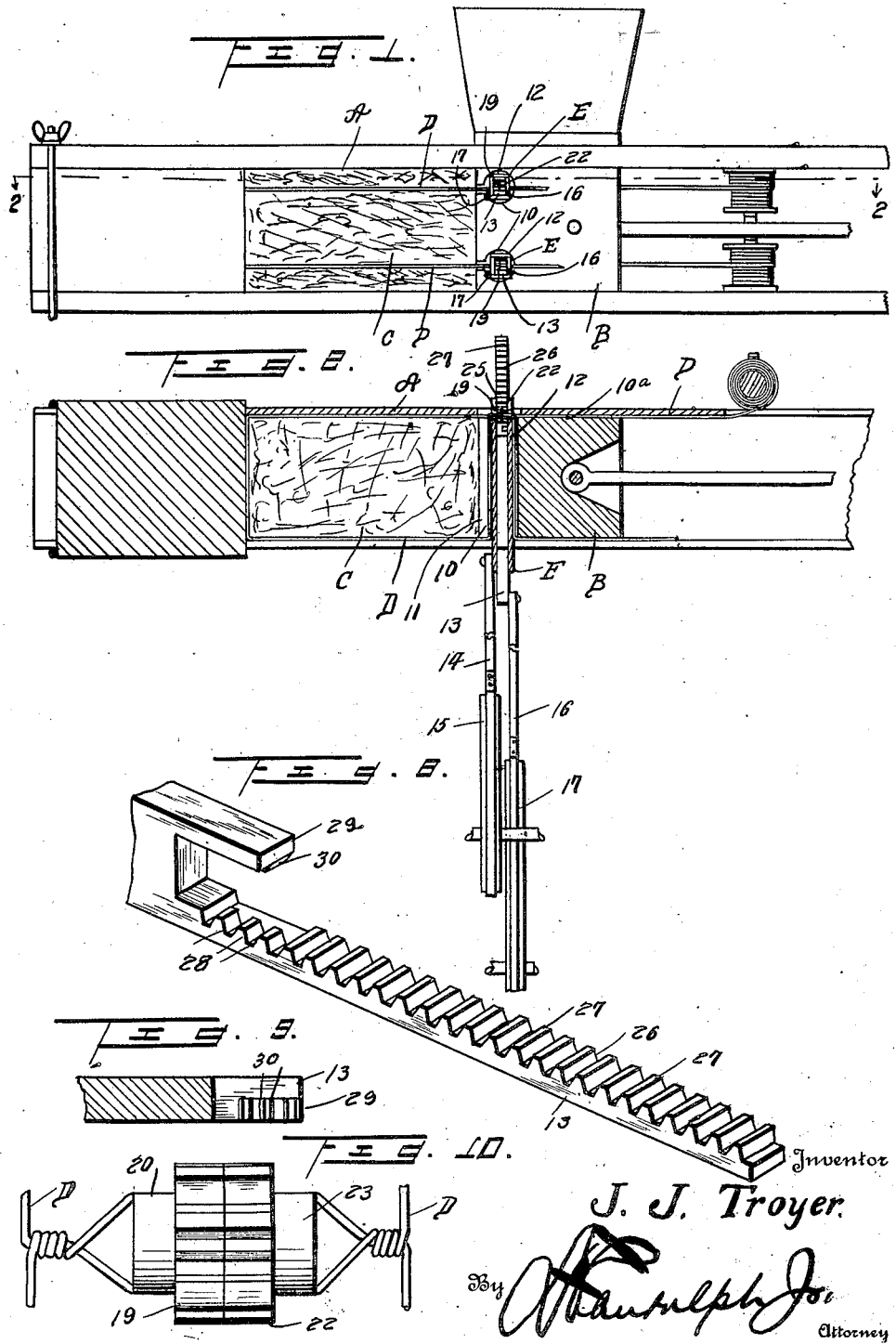
Inventor  
J. J. Troyer.

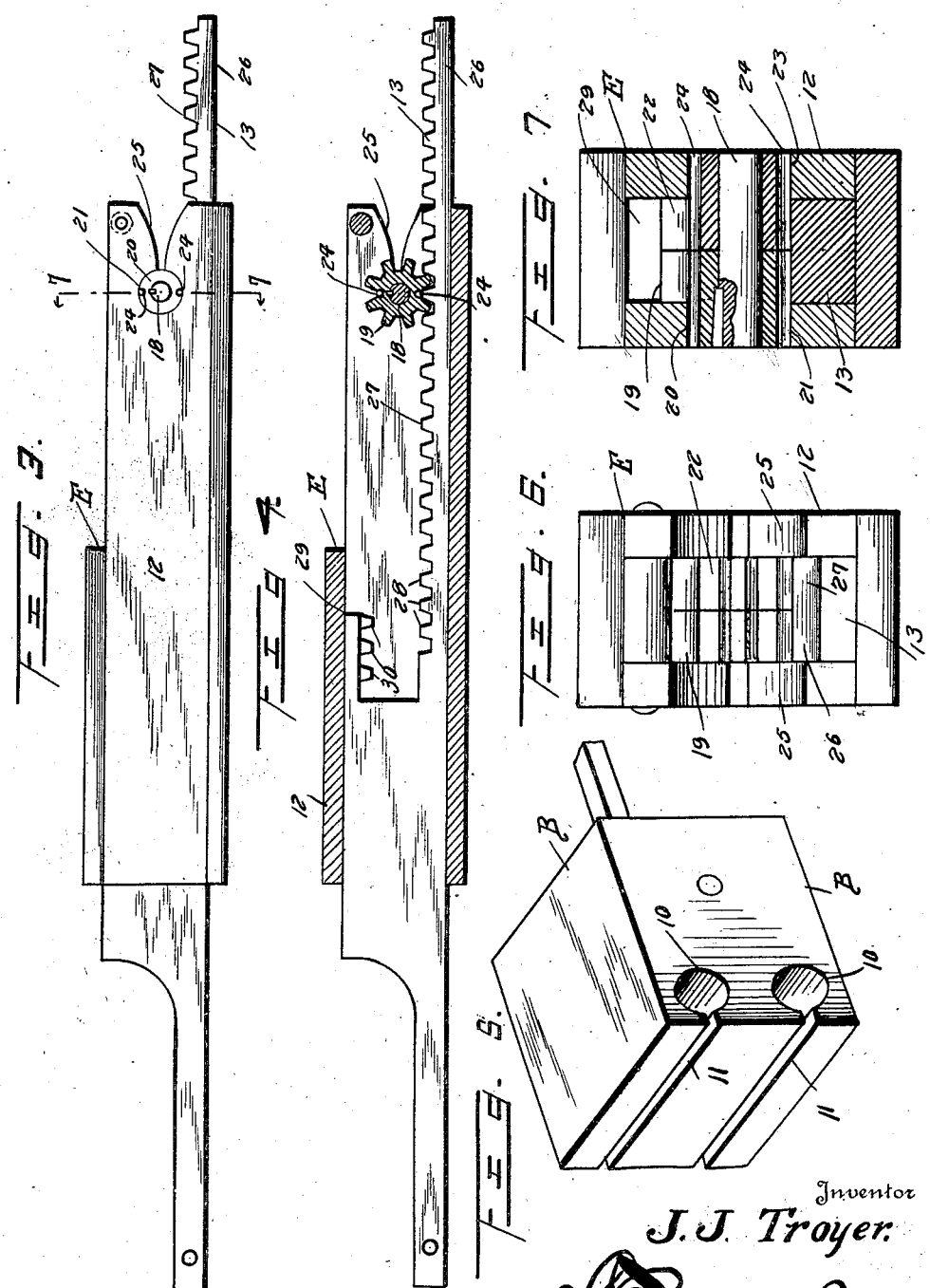

Patented Apr. 15, 1924.

1,490,146

UNITED STATES PATENT OFFICE.

JEREMIAH J. TROYER, OF CHOTEAU, OKLAHOMA.

BALE TIER.

Application filed March 14, 1922. Serial No. 543,544.

*To all whom it may concern:*

Be it known that I, JEREMIAH J. TROYER, a citizen of the United States, residing at Choteau, in the county of Mayes and State of Oklahoma, have invented certain new and useful Improvements in Bale Tiers; and I do hereby declare the following to be a full, clear, and exact description of the invention, such as will enable others skilled in the art to which it appertains to make and use the same.

This invention relates to a bale tying mechanism for baling presses.

An important object is to provide an efficient mechanism operable to tie the bales which overcomes the use of the usual blocks.

Another object is to provide such a tying means capable of actuation through the compression plunger while in the bale chamber after the compressing stroke and thus without hay or straw in its path of movement.

Still another object is to provide the said plunger with a transverse recess through which a tying device is operable and which recess has a relatively narrow slot open at the work end of the plunger for withdrawal of the tying wire, and thus being substantially closed against entrance of hay which might interfere with movement of the tying device.

A further object is to provide a tying device or needle with sections movable in the same direction independently of each other and in combination with elements jointly movable to tie the wires and then movable one element relatively to the other to cut the wire.

A still further object is to provide the said tying device or needle of the particular construction hereinafter described and illustrated in accompanying drawings.

Additional objects and advantages will become apparent from a consideration of the description following taken in connection with one practical embodiment as illustrated in the said drawings, and wherein:

Fig. 1 is a fragmentary side elevation of a baling press equipped with my improvements;

Fig. 2 is a horizontal sectional view on the line 2—2 of Fig. 1,

Fig. 3 is a side elevation of the tying device or needle;

Fig. 4 is a vertical longitudinal sectional view through said tying device;

Fig. 5 is a detail perspective view of the plunger;

Fig. 6 is a front elevation of said tying device;

Fig. 7 is a cross sectional view on line 7—7 of Fig. 3;

Fig. 8 is a perspective view of the rack section of the tying device looking toward the longer rack, Fig. 9 is a horizontal sectional view of such section looking toward the shorter rack, and Fig. 10 is a detail elevation of the twisting wheels.

Like reference characters designate like or similar parts in the different views.

Referring specifically to the drawings, a baling press is fragmentarily shown having a housing A about the baling chamber and a reciprocable plunger B operable in the latter to press the hay or other material into bales C. Two tie wires or elements D are preferably arranged at each side of the bales, although the number may vary as desired. The foregoing parts are to be taken as conventional, and it is to be understood that the wires may be supplied from any suitable source or mechanism. Particular attention is called to the fact that blocks necessary for tying are omitted as my improvements overcome the necessity of using them.

Plunger B at its work- or free-end is provided with transverse recesses 10, one for each of the wires D and housing A has grooves 10ª in its sides in line therewith. A relatively narrow slot 11 leads from each recess 10 and opens at the free end of the plunger; such recesses 10 thus being substantially closed against the entrance of hay or other material. Operable in the recesses are tying devices E. Thus the tying devices operate through the plunger and out of the path of hay as one advantageous feature aside from avoiding the use of the usual blocks as another advantageous feature.

Each tying device consists of a main or housing section 12, rectangular for instance in cross section, and a bar section 13, slidable in said housing section. Both sections are slidable by any suitable mechanism, preferably the driving mechanism of the baling press so that the tying operation will be automatic and after the formation of the bale. To this end a pitman 14 may be driven from an eccentric 15 and operatively pivoted to the section 12 while a pitman 16 may be driven from an eccentric 17 and operatively pivoted to the bar section 13, such pitmen and eccentrics being so proportioned as to drive the bar section 13 faster than the section 12.

Adjacent the forward end of section 12, a shaft 18 is disposed on which a gear wheel 19 is fixed and which has a laterally extending hub 20 journaled in an opening 21 in one side wall of section 12. Abutting gear wheel 19 and journaled on shaft 18 is a gear wheel 22 which has a laterally extending hub 23 journaled in an opening 21 in the other side wall of the housing section 12. Each of the gear wheels 19 and 22 and their hubs have wire-receiving grooves 24 disposed transversely thereof. The grooves 24 of one gear wheel at times are adapted to register with the grooves 24 of the other gear wheel. It is to be noted that the side walls of housing section 12 at one end are provided with substantially V-shaped slots or bifurcations at 25 in communication with openings 21.

Bar section 13 has a toothed rack member 26 of elongated form with its teeth 27 of a width to simultaneously mesh with the teeth of both gear wheels 19 and 22 to drive them as a unit. Adjacent the rear end of member 26, said teeth are interrupted transversely to provide narrower teeth 28 adapted to mesh with the teeth of but one of said gear wheels, namely 19. Section 13 has a second rack portion as at 29 above the portion 26 whose teeth 30 are of a width to mesh only with those of gear wheel 22.

In operation, after the plunger B has pressed the bale, the sections 12 and 13 of the tying device or needle are driven automatically by their driving mechanism transversely of the press through the recesses 10 of the plunger and housing A. As the section 12 advances, the adjacent tie wire or element D is received in the slots 25 and then into aligning grooves 24 of the gear wheels 19 and 22. The advancing movement of bar section 13 thereupon simultaneously rotates the gears 19 and 22, by engagement of broad teeth 27 therewith, in a path of 180 degrees, thus registering the remaining grooves 24 with the slots 25 which guide the tie wires D of the other side of the bale into said grooves 24 last mentioned. Further advance of the bar section 13 simultaneously rotates gears 19 and 22, causing twisting of the wires together on opposite sides of the tying device. Still further advance of the bar section 13 brings the teeth 28 and 30 into mesh with the gear wheels 19 and 22 whereby the gear wheel 22 is rotated slightly in the opposite direction to gear wheel 19 to sever or break the tie wire. Thereupon the operating means for the tying device withdraws the same to normal position to permit actuation of the plunger B, and thus successive operations of the baling press. The slots 11 enable the tie elements to move out of recesses 10.

As merely one practical embodiment has been illustrated and described, it is to be understood that changes may be resorted to within the spirit and scope of the invention.

I claim as my invention:

1. A tying device having tying and cutting gear members, means mounting said members for independent movement, a bifurcated bar, said bar at one side of the bifurcation extending beyond the other side and having teeth adapted to simultaneously mesh with said gear members and drive them as a unit, and said bar on opposite sides of the bifurcation and beyond said teeth having shorter teeth to individually engage said wheels and move them independently of each other in order to sever a tie.

2. A tying device having tying and cutting gear members, means mounting said members for independent movement, a bifurcated bar, said bar at one side of the bifurcation extending beyond the other side and having teeth adapted to simultaneously mesh with said gear members and drive them as a unit, and said bar on opposite sides of the bifurcation and beyond said teeth having shorter teeth to individually engage said wheels and move them independently of each other in order to sever a tie, a housing for the bar, means to move said housing and said bar and also move the bar at a greater rate of speed than said housing, spaced gear members being journaled on said housing, and opposite walls of said housing adjacent the said gear members having guide openings leading thereto.

In testimony whereof I affix my signature in presence of two witnesses.

JEREMIAH J. TROYER.

Witnesses:
  G. B. LINDSEY,
  H. L. MARTIN.